United States Patent [19]
Wood

[11] Patent Number: 5,393,481
[45] Date of Patent: Feb. 28, 1995

[54] LINING OF PIPELINES OR PASSAGEWAYS

[75] Inventor: Eric Wood, Castletown, Isle of Man

[73] Assignee: Insituform (Netherlands) BV, Rotterdam, Netherlands

[21] Appl. No.: 934,678

[22] PCT Filed: Apr. 22, 1991

[86] PCT No.: PCT/GB91/00628
§ 371 Date: Sep. 10, 1992
§ 102(e) Date: Sep. 10, 1992

[87] PCT Pub. No.: WO91/16568
PCT Pub. Date: Oct. 31, 1991

[30] Foreign Application Priority Data
Apr. 23, 1990 [GB] United Kingdom ............... 9009073

[51] Int. Cl.6 ............................................. B29C 63/36
[52] U.S. Cl. ............................ 264/516; 156/287; 156/294; 156/574; 264/269
[58] Field of Search ............... 264/36, 269, 516, 31, 264/35; 138/97, 98; 156/287, 294, 574

[56] References Cited
U.S. PATENT DOCUMENTS

| 4,724,108 | 2/1988 | Jurgenlohmann et al. | 264/269 |
| 4,980,116 | 12/1990 | Driver | 264/269 |
| 5,167,901 | 12/1992 | Driver et al. | 264/516 |

FOREIGN PATENT DOCUMENTS

| 0241719 | 10/1987 | European Pat. Off. |
| 2082285 | 3/1982 | United Kingdom |
| 8503758 | 8/1985 | WIPO |
| 8908218 | 9/1989 | WIPO |

Primary Examiner—Mathieu D. Vargot
Attorney, Agent, or Firm—Lowe, Price LeBlanc & Becker

[57] ABSTRACT

The lining of a lateral pipe which leads into a main pipe is achieved by everting a resin impregnated tubular lining through an elbow in the main pipe, eversion being accomplished by a fluid under pressure supplied through a pressure pipe, the elbow being held in position by an inflatable bag which is inflated by said fluid, the bag sealing the lateral/main pipe junction, and the bag being such that at least one additional pressure pipe may extend past the seal arrangement so that at the same time that the first mentioned lateral lining is curing a second lateral may be similarly lined.

8 Claims, 2 Drawing Sheets

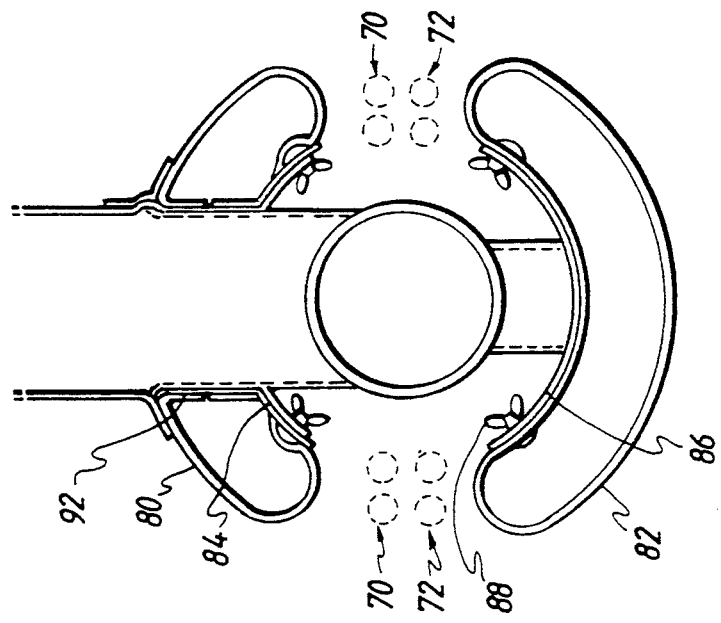
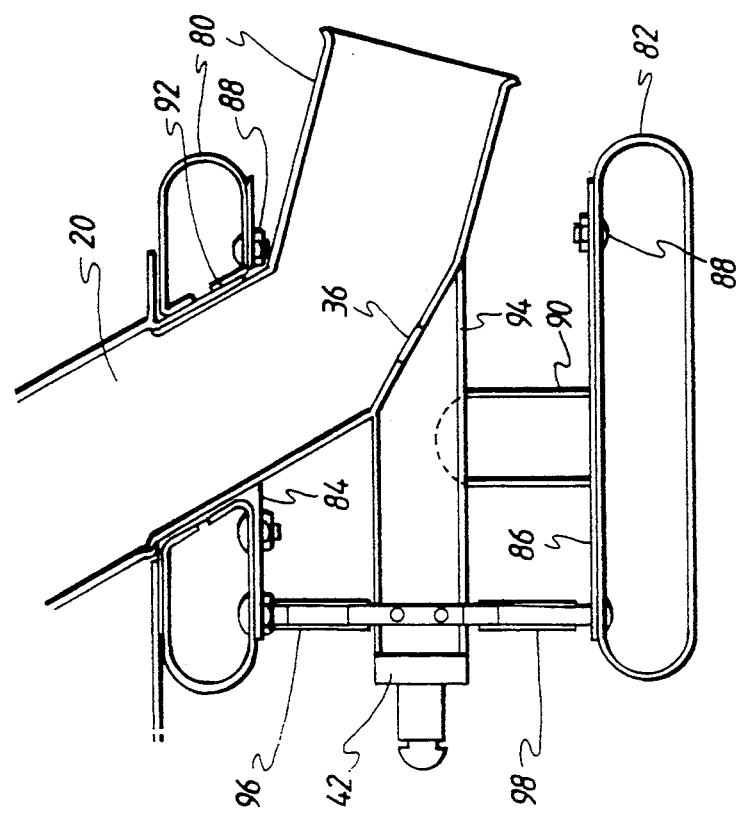
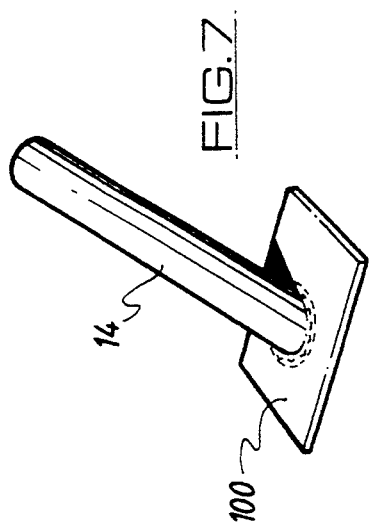

LINING OF PIPELINES OR PASSAGEWAYS

This invention relates to the lining of pipelines or passageways, using flexible tubular materials which are impregnated with curable synthetic resin and which, when placed in position linings the pipeline or passageway are held by fluid pressure against the pipeline or passageway surface until the resin cures to a hard condition leaving a hard lining pipe lying on the pipeline or passageway surface.

BACKGROUND OF THE INVENTION

The most widely practised method using such resin impregnated linings is disclosed in British Patent No. 1449455 from which it will be seen that the impregnated lining is applied to the pipeline or passageway surface by eversion of same into the pipeline or passageway, using fluid pressure.

The present invention is concerned with lining pipelines which are called "laterals" insofar as they enter sidewise a main pipeline or passageway, such as a main sewer. Of any particular main line, there may be a plurality of laterals entering the main line, and it frequently arises that the laterals have to be lined by means of a resin impregnated tube. Using existing methods for lining laterals, it is not possible to perform any lining operation of a second or subsequent lateral whilst the lining in one lateral is being cured. As the cure time may take up to 5 or 6 hours, if a section of main line having say 5 laterals to be lined is involved, the minimum total time to line all laterals will be in the order of 25 to 30 hours. As these lining operations are required to be carried out during the night for purposes of convenience, it is often the case that the completion of the work has to take place over several evenings and therefore the work crew must depart the site and return at a later date to complete the work.

The present invention is concerned with providing an arrangement wherein the completion of a plurality of lateral lining operations may be effected in a much shorter period.

In accordance with the present invention, a plurality of laterals meeting a common main line are lined by inserting resin impregnated linings into said laterals and to hold same in position by fluid pressure whilst curing of the resins takes place, and after insertion of each lining, a seal arrangement at the location where the lateral meets the main line enables the second and subsequent laterals to be lined whilst the first or previously inserted lining is held in position and is being cured.

THE INVENTION GENERALLY

The seal arrangement may comprise a flexible bag which is pressurised with the medium which urges the lining against the lateral surface so as to prevent escape of the pressurising medium, but such bag allowing pressure fluid supplying pipes to pass to the inside or outside of the bag and to other lateral connections downstream of the bag in the main pipe whereby such other laterals may be lined by the eversion there into of a resin impregnated lining tube, the holding of the lining tube to the lateral surface being affected by fluid pressure, and a sealing bag retaining the lining in position and forming a seal between the lateral and the main line.

It will be seen that by using the method, the linings for the laterals can be inserted sequentially, and held in installed position under pressure, and cured simultaneously. A plurality of laterals can be lined and cured in a total time equal to the time it takes to line one lateral multiplied by the number of laterals plus the curing time for one of the lateral linings which total time in the case of 5 laterals may be in the order 8 hours, which is a considerable reduction from the 25–30 hours which are required for the lining of 5 laterals by the conventional method. For example therefore the lateral lining on any particular contract may be capable of being completed in one evening as opposed to being completed in stages over two or three evenings.

BRIEF DESCRIPTION OF THE DRAWINGS

Embodiments of the invention will now be described, by way of example, with reference to the accompanying diagrammatic drawings, wherein:

FIG. 5 is a sectional side view of an alternative form of apparatus for carrying out the method of the invention.

FIG. 6 is an end view of the arrangement shown in FIG. 5; and

FIG. 7 is a perspective view of the lining tube used in the method of FIGS. 5 and 6.

PREFERRED EMBODIMENTS OF THE INVENTION

Figures 1, 2, 3, 4:
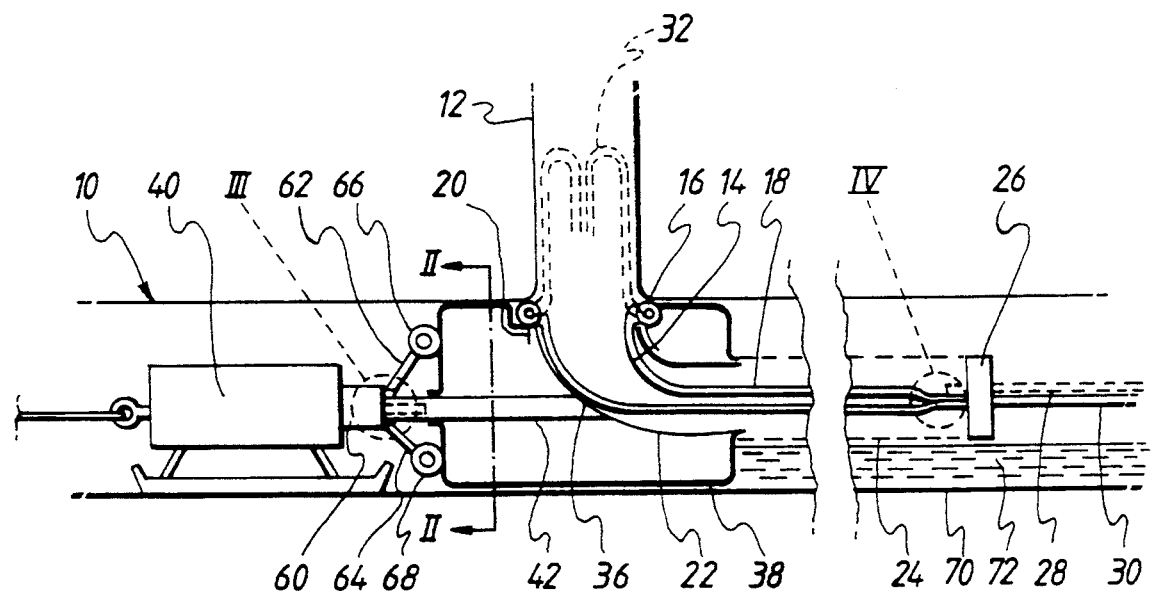
FIG. 1 is a diagrammatic side elevation showing the method by which a lateral is lined in accordance with the method of the invention.
FIG. 2 is a sectional elevation taken on the line II—II.
FIG. 3 is an enlarged sectional view of the detail ringed III in FIG. 1.
FIG. 4 is an enlarged sectional view of the detail ringed IV in FIG. 1.

Referring to the drawings, in FIG. 1 a main line 10 is intersected by a lateral 12 which is to be lined in accordance with a first method of the invention.

For the lining operation, a resin impregnated flexible lining tube 14 has a beaded end 16 which is reinforced, and forms a ring which seats against the opening of the lateral 12. The tube 14 is loaded inside a carrier tube 18. Carrier tube 18 has one end 20 anchored to an elbow pipe 22, and to the other end of the elbow 22 is connected a containment tube 24. A disc 26 seals the other end of the containment tube, but extending through the disc is a pressure hose 28 and a bleed hose 30.

The pressure hose 28 and bleed hose 30 can slide through the disc 26 as insertion of the lining tube 14 takes place as will be explained.

If reference is made now to FIG. 4, as shown, the tail end of the carrier tube 18 is closed around the bleed hose 30, and the pressure hose 28 is connected to the closed end of the carrier tube 18. The end of the lining tube 14 stops short of the end of the carrier tube so that the lining tube can be left in position lining the lateral 12.

The method of insertion comprises the introduction of pressurising fluid, water or gas, through the pressure hose 28 into the space between the containment tube 24 and the carrier tube 18 with the result that the carrier tube 18 and the lining tube 14 are everted as shown at 32 in FIG. 1 into the lateral 12, the lining tube 14 being presented to the lateral surface. The assembly of tubes 14 and 18 therefore everts into the lateral 12 and the pressure hose 28 and the bleed hose 30 are pulled through the containment tube, through the elbow 22 and up to the top end of the lateral. The portion 30A of the bleed hose projects out of the end of the eversion face so that if any water collects above the lining, it can bleed through end 30A, which is provided with apertures 34 for this purpose, out of the tube 30 and back to drain so that there will be no undesirable collection of liquid in the lateral whilst lining is taking place.

The pressure fluid which is supplied by the hose 28 leaks through an aperture 36 in the elbow 22 and pressurises a bag or bladder 38 surrounding the elbow as shown. The bladder is therefore inflated so as to seal against the main line 10 and to seal the end 16 of the lining. The aperture is provided with or acts as a pressure reduction means so that whilst the everting pressure may be of the order of 20 p.s.i., the pressure in the bag or bladder 38 is much lower e.g. in the order of 5 p.s.i. The bladder 38 remains pressurised as long as the pressure is maintained inside the everted lining and carrier tube. As soon as this position has been reached, a towing assembly 40 which is used for positioning the elbow 22 by being connected thereto through a link 42 fast with elbow 22, is released from that link insofar as, as shown in FIG. 3, the link 42 has a socket 44 in which engages a centralising pin 46. The wall of the socket 44 has aligned apertures 48, 50 in which pegs 52 and 54 engage, these pegs being carried by pivotable jaws 56 and 58. The jaws 56 and 58 are connected to the clamping device 60 having swingable arms 62 and 64 on the ends of which are provided guide rollers 66 and 68. As the bladder 38 inflates, the rollers 66 which are held inwardly by spring action are caused to pivot to the position shown in FIG. 1 which has the effect of moving the jaws 56 and 58 apart to remove the pegs 52 and 54 from the apertures 48 and 50 and the positioning device 40 and the device 60 with the rollers and jaws can be detached from the bladder and the connecting tube 42 so that it can be pulled along the line 10 away from the inflated bladder.

A series of additional pressure pipes and corresponding bleed pipes 70, 72 (four in all) extend to the outside of the bladder 38 and are removably attached to the positioning device 40. Device 40 is moved to the other end of the main line 10 and a second assembly comprising elbow 22, bladder 38, containment tube 24, sealing disc 26 and the carrier tube and lining 18 and 14 with bladder 38 is connected to the positioning device (and one of the additional pressure/bleed pipe pair) which is again moved back into the main line 10 until the next lateral to be lined is reached when the device is placed in register therewith so that by appropriate pressurising of the assembly as described in relation to FIG. 1, the lining tube can be inserted into position in the lateral. When this process has been completed, the procedure is again repeated so that all five laterals can have lining tubes placed therein and the lining tubes can be cured simultaneously.

To effect the curing, it may be necessary to circulate hot water, steam or hot air through the pressurising hoses 28, 70 and 72 if the resin is of the heat cure type.

When curing has been completed, it is simply a matter of releasing the pressure in each of the bladders 38 which will then collapse, and each can be removed from the main line 10 by pulling on the pressure hose 28, 70 or 72 as the case may be. The retraction of such hose retracts the carrier tube 18 from inside the lateral, leaving the rigid lining tube 14 in position.

In the alternative arrangement shown in FIGS. 5, 6 and 7, the method of operation is the same as that described in relation to FIGS. 1–4, and only the structure of the bladder is varied in order to make it easier for the additonal pressure/bleed pipes to pass the bladder assembly whilst it is inflated.

Thus, the bladder is in the form of diametrically opposite inflatable pillows 80, 82 which are carried on inner diametrically opposite plates, 84, 86 connected to the elbow 22 by being bolted thereto by bolts 88. Plate 86 is carried by the elbow 22 on a radial leg 90 which is adjustable in length so that the arrangement can be adjusted to suit pipes of different diameters. Pillow 80 has a hole, 92 therein through which the elbow pipe 22 passes the pipe 94 which extends from the elbow 22 forms passage for the everting medium and also carries the coupling 42. Pipes 96, 98 connect the interior of the pipe 94 and the pillows 80, 82. The aperture 36 is also shown in FIG. 5. The operation of the arrangement of FIGS. 5, 6 and 7 will be understood from the previous description of the embodiment of FIGS. 1–4. The lining 14 and the carrier tube 18 are inverted by pressurising the interior of elbow 22 and at the same time by passage of the pressurising medium through hole 36, pipe 94, and pipes 96, 98 inflation of the pillows 80, 82 to seal the lateral aperture whilst eversion takes place. The additional pressure/bleed pipes 70, 72 can pass between the pillows easily as shown in FIG. 6 in dotted lines. Whilst pillow 80 seals the lateral, pillow 82 forms a reaction means.

The lining tube 14 in the FIG. 7 arrangement as shown has a collar 100 which is preferably a sealed envelope containing a resin absorbent material which is impregnated with curable synthetic resin similar to the tube itself. As the lining tube 14 cures so the collar will also cure and the collar remains in place around the lateral aperture.

The present invention provides a system whereby a plurality of lateral linings may be cured simultaneously thereby reducing the overall cure time in a contract where a number of laterals have to be lined.

I claim:

1. A method of lining a lateral pipe leading into a main pipe, wherein a resin impregnated lining is inserted into the lateral pipe from inside the main pipe using a fluid medium under pressure, and wherein a seal arrangement forms a seal at the location where the lateral meets the main pipe as curing of the resin takes place, and wherein the fluid medium is supplied to insert the lateral lining by means of a pressure pipe, and at least one additional pressure pipe extends past the seal arrangement so that pressure fluid can be applied to another lateral lining remote from the first mentioned lateral lining while curing of the first mentioned lateral lining is taking place.

2. The method according to claim 1, wherein said seal is formed by an inflatable means, said inflatable means being inflated by the fluid medium used for inserting the lateral lining, but at a lower pressure.

3. The method according to claim 1, wherein the lateral lining is everted into the lateral through an elbow pipe and the seal arrangement is exterior of the elbow pipe.

4. The method according to claim 2, wherein the lateral lining is everted into the lateral through an elbow pipe and the seal arrangement is exterior of the elbow pipe.

5. The method according to claim 2, wherein the inflatable means comprises a bag or bladder which is inflated against the main pipe.

6. A method according to claim 2 wherein said inflatable means comprises a pair of spaced diametrically opposed inflatable pillows.

7. A method according to claim 1, wherein the lining tube is provided with a collar which is applied to the location at which the lateral meets the main pipe, and the lining is of finite length and is open ended.

8. Apparatus for inserting a resin impregnated lining into a lateral pipe which leads to a main pipe comprising an elbow pipe by which the lining is inverted into the lateral pipe from inside the main pipe using fluid medium under pressure into the lateral from the main pipe, said elbow pipe having connected thereto an inflatable sealing arrangement whereby the elbow may be locked in position in the main pipe by means of said fluid medium, and so that a pressure pipe may extend along the main pipe past the sealing arrangement so that a further lining may be inserted into a further lateral while the sealing arrangement holds the elbow in position in the main pipe and the resin impregnated first mentioned lining cures.

* * * * *